Feb. 17, 1931.  R. J. BELL  1,793,351
BARREL FORMING MACHINE
Filed March 13, 1929   7 Sheets-Sheet 1

R. J. Bell
INVENTOR
BY Victor J. Evans
ATTORNEY

Feb. 17, 1931.　　　R. J. BELL　　　1,793,351
BARREL FORMING MACHINE
Filed March 13, 1929　　　7 Sheets-Sheet 2
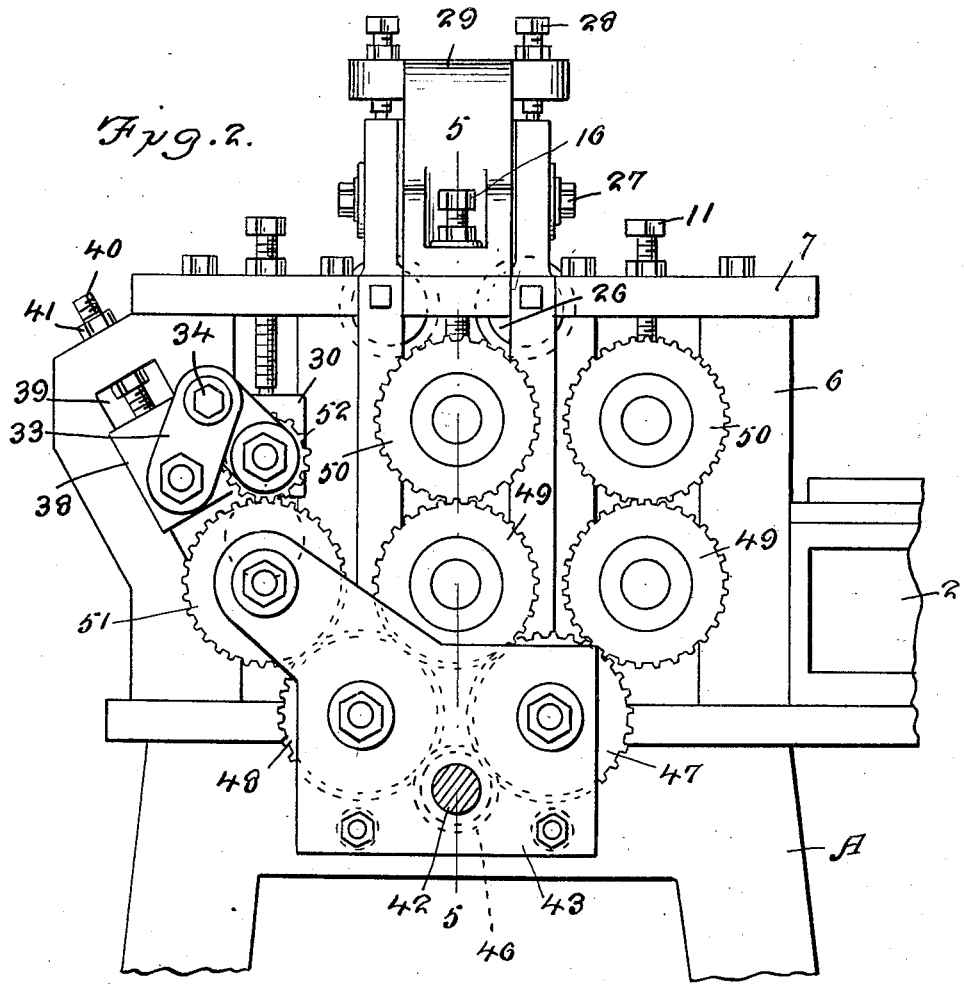
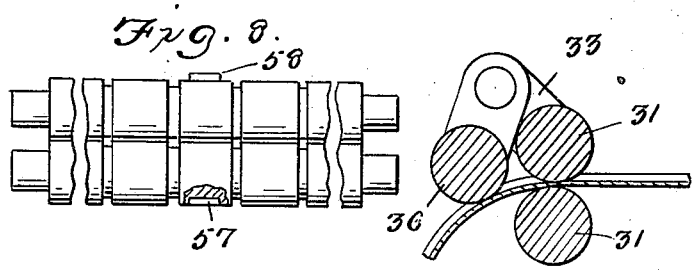
R. J. Bell
INVENTOR
BY Victor J. Evans
ATTORNEY

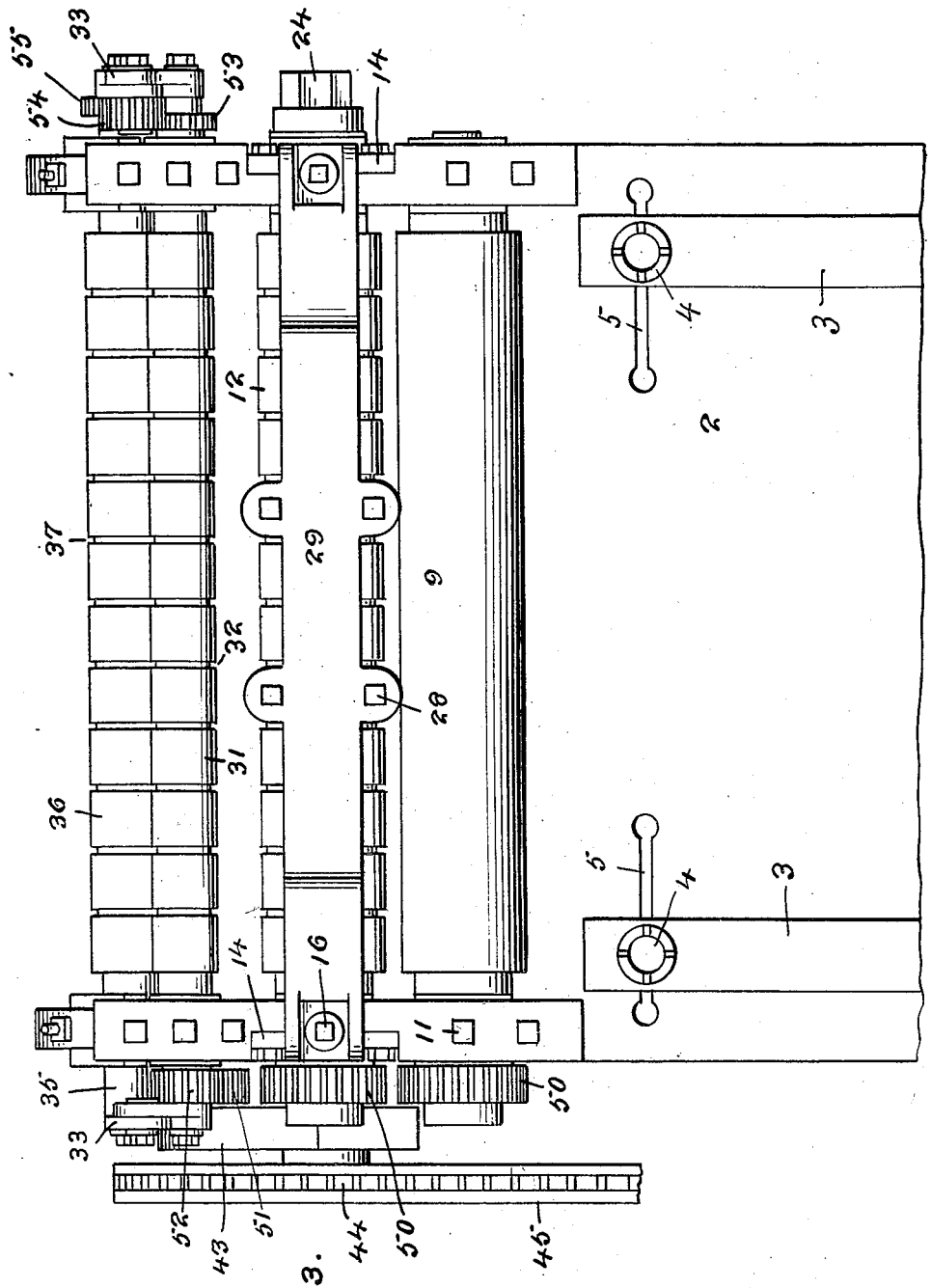

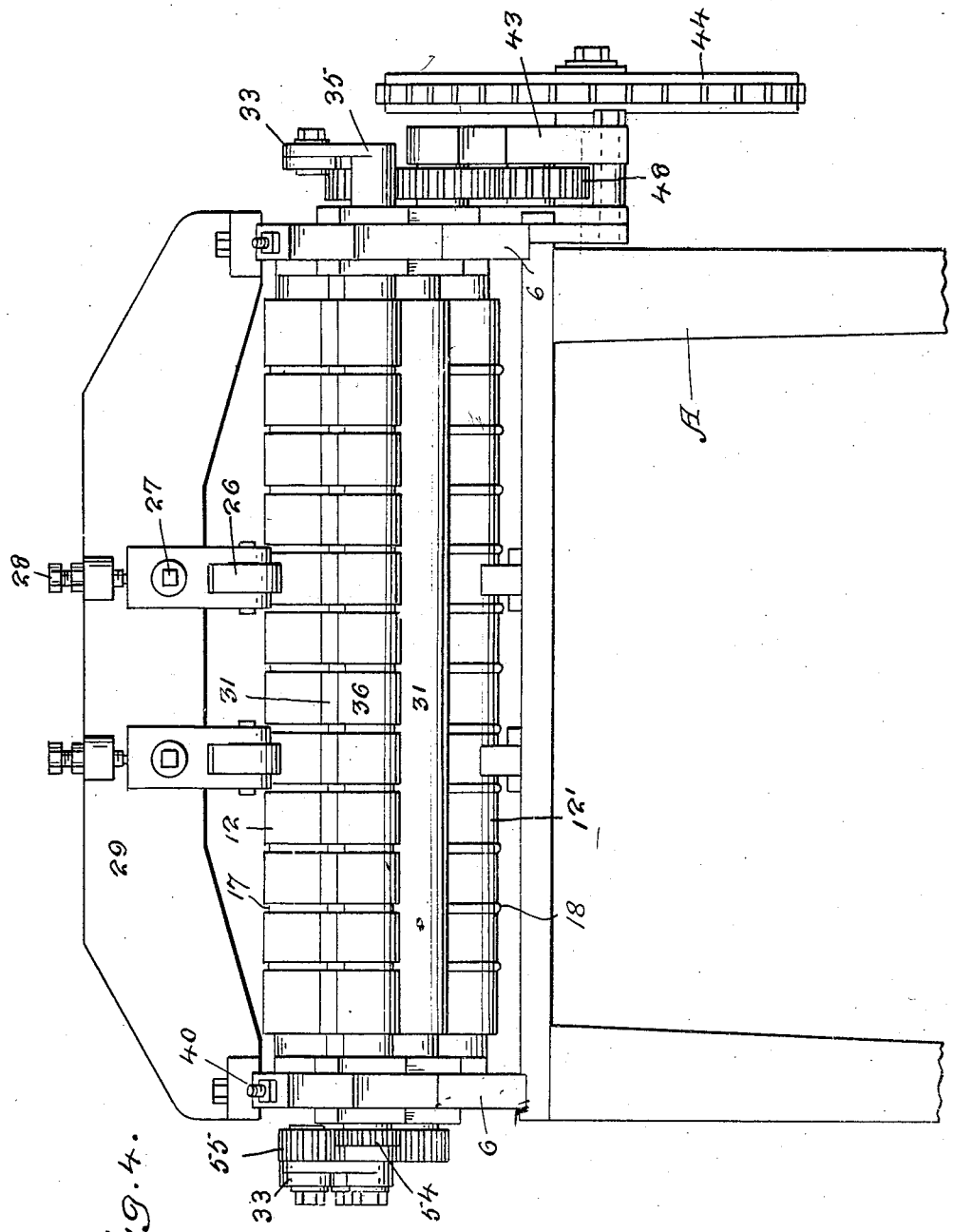

Feb. 17, 1931.  R. J. BELL  1,793,351
BARREL FORMING MACHINE
Filed March 13, 1929  7 Sheets-Sheet 5

R. J. Bell
INVENTOR
BY Victor J. Evans
ATTORNEY

Feb. 17, 1931.  R. J. BELL  1,793,351
BARREL FORMING MACHINE
Filed March 13, 1929   7 Sheets-Sheet 6

R. J. Bell
INVENTOR

BY Victor J. Evans
ATTORNEY

Feb. 17, 1931.     R. J. BELL     1,793,351
BARREL FORMING MACHINE
Filed March 13, 1929     7 Sheets-Sheet 7

R. J. Bell
INVENTOR
BY Victor J. Evans
ATTORNEY

Patented Feb. 17, 1931

1,793,351

UNITED STATES PATENT OFFICE

ROBERT J. BELL, OF JACKSONVILLE, FLORIDA, ASSIGNOR TO R. J. BELL COMPANY, INC., OF JACKSONVILLE, FLORIDA, A CORPORATION OF FLORIDA

BARREL-FORMING MACHINE

Application filed March 13, 1929. Serial No. 346,628.

This invention relates to a beading and forming machine mainly designed for producing metal barrels, kegs, boxes and other containers of any size or shape, the general object of the invention being to provide several rollers shaped to form beads in a sheet of metal passing through the same, with bending means operating on the sheet after it passes through the beading rollers to bend the sheet into a cylinder or semi-cylinder, with means for adjusting the bending means so as to produce cylinders of different diameters and widths.

Another object of the invention is to provide means whereby any desired number of beads may be formed in the sheet.

A further object of the invention is to provide means for punching or stamping the sheet as it passes through the machine.

Another object of the invention is to provide automatic means for feeding the sheets into the machine.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is an elevation of the opposite side thereof.

Figure 3 is a top plan view.

Figure 4 is a view of the rear end.

Figure 7 is a sectional detail view through the bending rollers, with a sheet of material passing through the same.

Figure 8 is a view of a pair of rollers provided with punching or stamping means.

Figure 1:
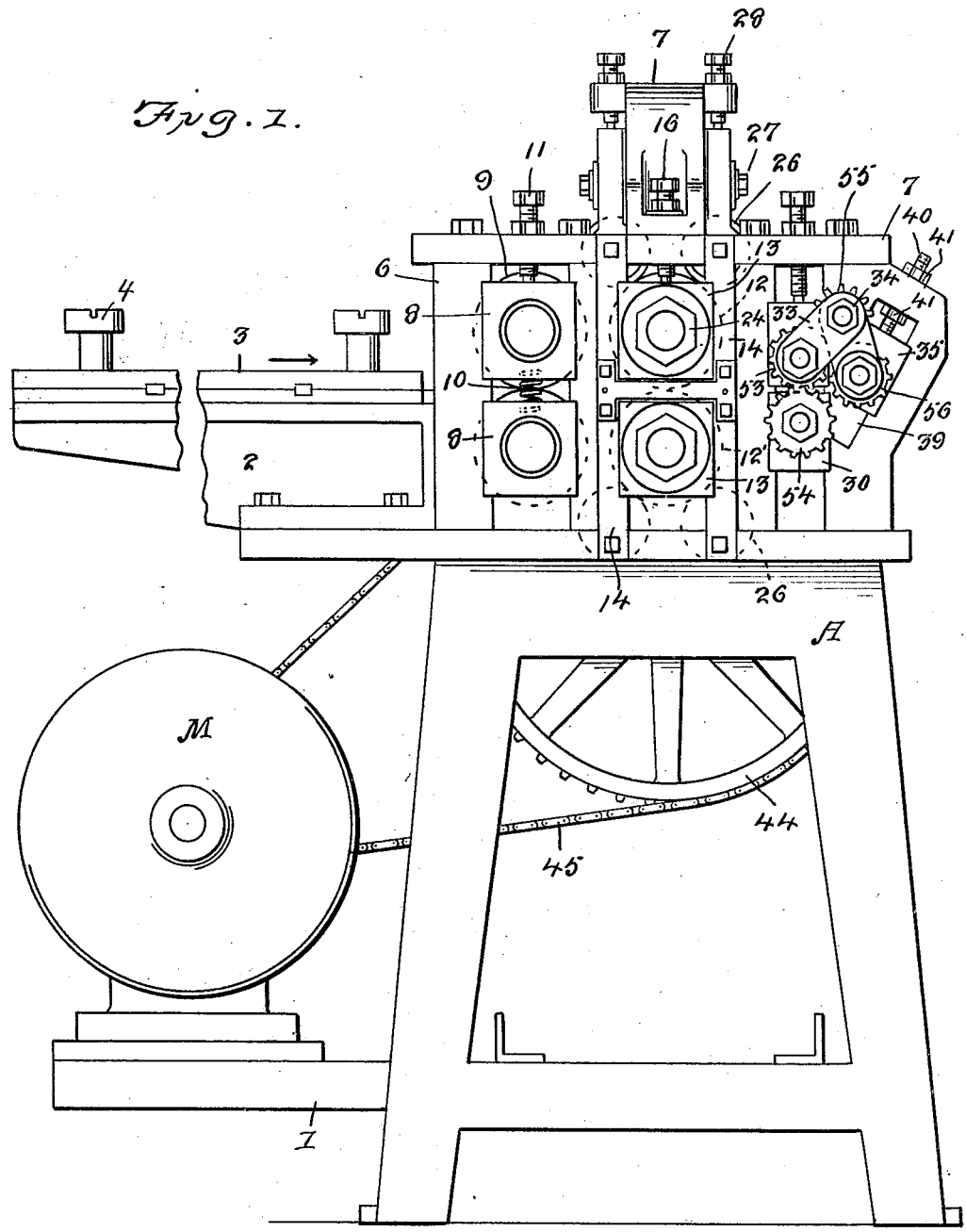
Figure 1 is an elevation of one side of the machine.
Figure 5:
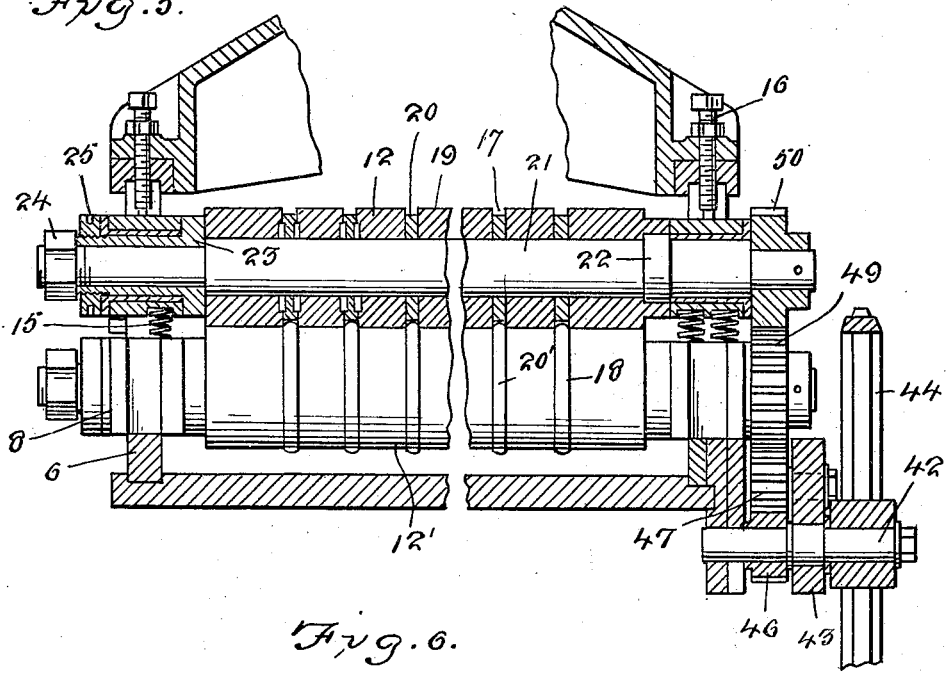
Figure 5 is a section on line 5—5 of Figure 2.
Figure 6:
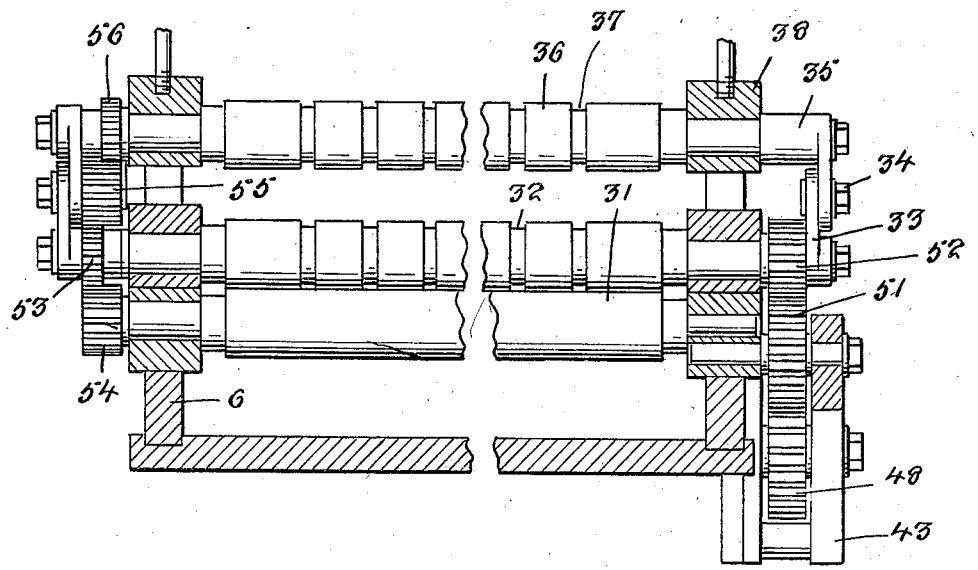
Figure 6 is a view partly in section of the bending rollers, with one roller swung upwardly.

In these views, the letter A indicates an upright frame for supporting the various parts of the machine, said frame having a stand 1 at its front adjacent the bottom thereof for supporting a motor M and a feeding table 2 is connected with the front of the machine above the stand 1, this table having a pair of guides 3 thereon which are adjustable toward and away from each other through means of the bolts 4 passing through the transverse slots 5 in the table. Thus the guides can be adjusted to suit any width of sheet being passed into the machine.

A plurality of uprights 6 is connected with the top of the frame A at each side thereof, the upper ends of the uprights being connected together by the cross-piece 7 which is bolted to the uprights and these uprights are spaced apart, with the front pairs of uprights forming vertical guides for the upper and lower bearing blocks 8, in which the trunnions of the feeding rollers 9 are journaled. A spring 10 is placed between each pair of bearing blocks and tends to force the upper block away from the lower block and the upper blocks are adjusted through means of the bolts 11 which pass through the cross-bar 7. Thus the upper roller 9 can be adjusted in relation to the lower roller.

The beading rollers 12 and 12' have their trunnions engaging the bearing blocks 13 which are arranged in guides formed by the vertical bars 14 which are bolted to a part of the frame A and to the cross bar 7. Springs 15 are arranged between the upper and lower blocks of the beading rollers and tend to force the upper blocks away from the lower blocks and the upper blocks are adjusted by means of the bolts 16. The upper roller 12 has annular grooves 17 therein and the lower roller 12' has annular ribs 18 thereon for engaging the grooves to form beads on the sheet passing between the rollers. These rollers are preferably formed of sections 19 spaced apart by small sections 20, the sections 20 of the upper roller being of less diameter than the large sections 19 and the sections 20' which form the beads of the lower roller being of greater diameter than the other sections of this roller, and the sections of each roller are placed on a mandrel 21 which has a collar 22 adjacent one end thereof against which bears the first section, this first section having a recess therein to receive the collar and the last section bearing against a bushing 23 which fits in the bearing block so that by removing the nut 24 from one end of the mandrel and the nut 25 from the bushing and then removing the members 14, the bushing 23 can be removed so that the sections can be withdrawn from the mandrel and other sections substituted. Thus each beading roller can have sections placed thereon to form the beads on the sheet any distance apart.

Pairs of upper and lower pressure rollers 26 are suitably attached to parts of the frame, such as by means of the bolts 27, the upper rollers bearing against the upper part of the roller 12 and the lower pressure rollers bearing against the lower part of the roller 12', these rollers acting to strengthen the rollers 12 and 12' and prevent bending of the same. The pressure rollers may be adjusted by means of the adjusting nuts 28. The upper pressure rollers are carried by the bridge piece 29 which has its ends connected with the side bars 7.

Upper and lower bearing blocks 30 are vertically movable between the rear pairs of uprights, these blocks supporting the small feeding rollers 31, the upper one of which is provided with the annular grooves 32 for receiving the beads formed in the sheet by the rollers 12 and 12'. Links 33 are loosely supported at the ends of the top roller 31 and these links are connected by the bolts 34 with the sleeves 35 loosely arranged on the ends of a roller 36 which is also formed with the annular grooves 37. This roller 36 is carried by the bearing blocks 38 slidably arranged in the diagonally arranged slots 39 formed in the rear upright, and these blocks are adjustable in the slots through means of the bolts 40 and the nuts 41.

A stub shaft 42 is journaled in one side of the frame A and in a plate 43 bolted to the frame and held in spaced relation thereto. This stub shaft carries a large sprocket 44 over which a chain 45 passes, this chain also passing over a sprocket on the shaft of the motor M. The stub shaft carries a pinion 46 which meshes with the gears 47 and 48, the shafts of which are journaled in the frame and in the plate 43 and the gear 47 meshes with the gears 49, one of which is connected with the pintle of the lower feed roller 9 and the other of which is connected with the lower bead roller 12'. These gears 49 mesh with similar gears 50 connected respectively with the upper feeding roller 9 and with the upper beading roller 12. The gear 48 meshes with a gear 51, the shaft of which is journaled in an extension of the plate 43 and this gear meshes with a gear 52 on the upper roller 31 and a gear 53 is connected with the opposite end of the roller 31 and meshes with a gear 54 on the lower roller 31 and with an idle gear 55 carried by one of the bolts 34 and this idle gear meshes with a gear 56 on the roller 36.

From the foregoing it will be seen that all the rollers are driven from the motor driven sprocket 44 and that the roller 36 can be adjusted through means of the bolt 40 and its sliding bearing blocks without throwing the gears 55 and 56 out of mesh. The sheet is fed between the feed rollers 9 by pushing the sheet along the table 2, the sheet being guided by the guides 3 and these feed rollers feed the sheet between the beading rollers 12 and 12' which form the beads in the sheet. The sheet then passes between the small rollers 31 and is acted on by the roller 36 which bends the sheet into proper shape, as shown in Figure 7. By properly adjusting this roller 36, the sheet can be bent into the desired shape.

A pair of the rollers may be provided with punching or stamping means. Figure 8 showing a roller formed with a recess 57 and the companion roller provided with a projection 58 for forcing a portion of the sheet into the recess so as to punch a hole in the same, or if desired, stamping means may be formed on the rollers to stamp suitable indicia on the sheet.

Figure 9:
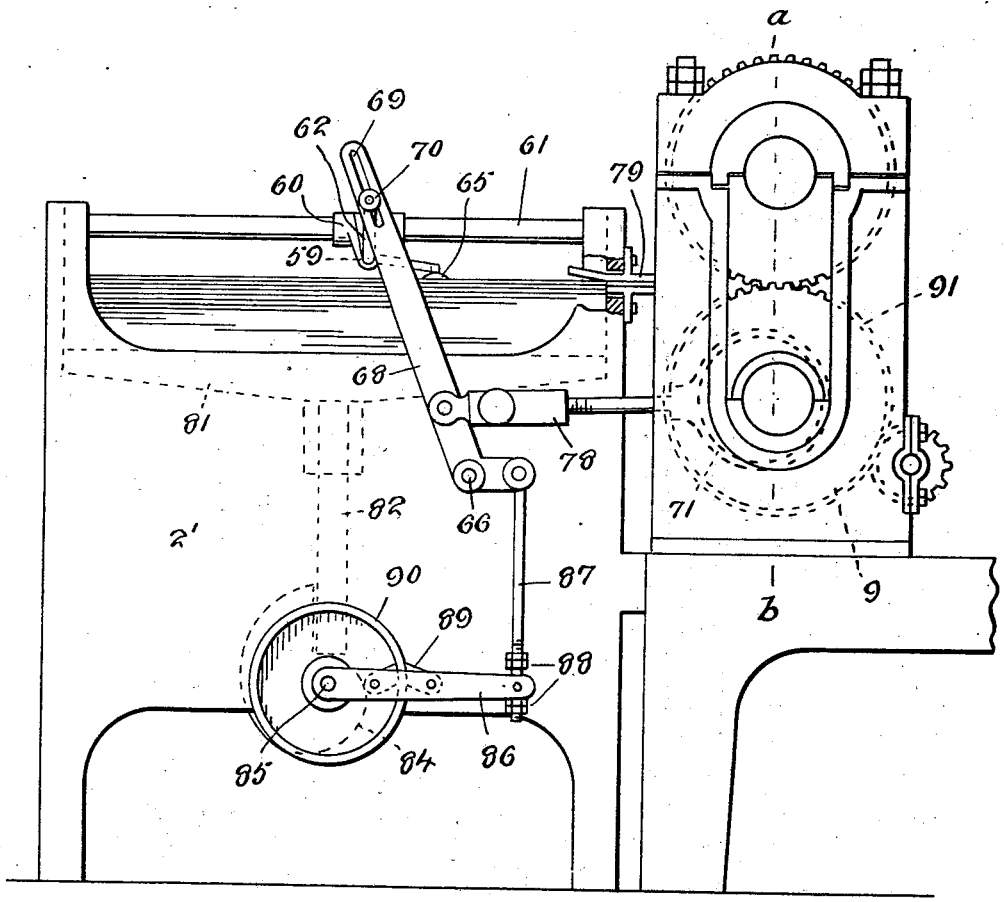
Figure 9 is an elevation, showing the feeding means.
Figure 11:
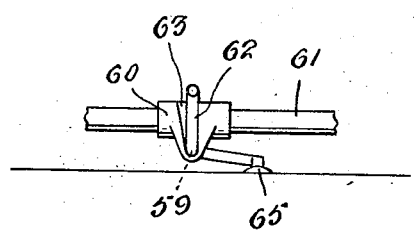
Figure 11 is a detail view of the means for raising and lowering the suction cups.
Figure 10:
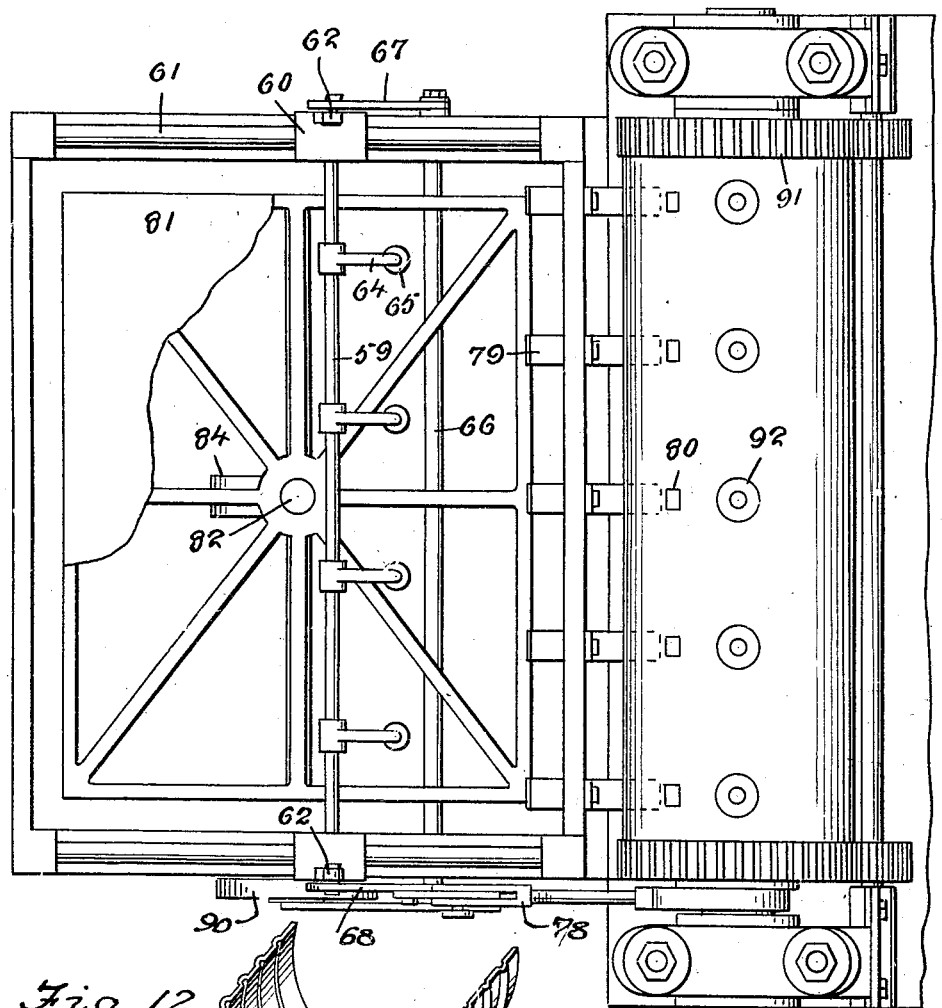
Figure 10 is a plan view of the feeding means.
Figure 12:
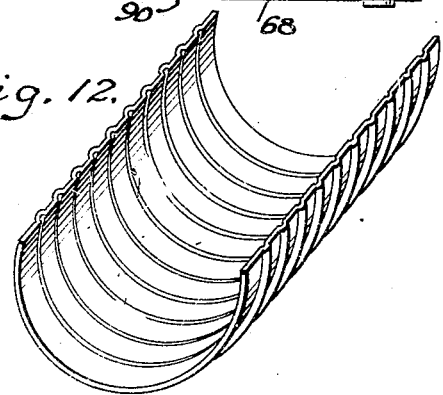
Figure 12 is a view of an article made by the apparatus.

The feeding means shown in Figures 9, 10 and 11 comprises a rock-shaft 59 journaled in blocks 60 which are supported for sliding movement on the side bars 61 of the feeding table 2', this shaft having cranks 62 at its ends which operate in wedge-shaped slots 63 in the outer face of the blocks, the walls of the slot acting as means for limiting the rocking movement of the shaft. The shaft carries the arms 64 which support the vacuum cups 65 for engaging the top of the stack. A shaft 66 passes through the table adjacent the center thereof, and an arm 67 is attached to one end of the shaft and a bell-crank 68 is attached to the other end. The upper ends of the arm and bell-crank are formed with the slots 69 for receiving the pintles 70 of the cranks 62. An eccentric 71 is carried by one of the trunnions of the lower feed roller 9 and the strap of said eccentric is connected with the bell-crank 68 by an adjustable connection 78 so that the bell-crank will be rocked during the rotary movement of the lower feed roller and during the first part of the movement of the bell-crank toward the roller, the bell-crank and arm 67 will pull the cranks 62 of the shaft 59 forwardly until they strike the front walls of the notches 63 so that the shaft 59 will be rocked and thus the cups placed in contact with the top plate of the stack of plates. Further movement of the lever and arm 67 will then cause the blocks 60 to slide on the bars 61 toward the rollers and thus move the top sheet horizontally between the upper and lower guiding plates 79 to a point where the plate will be gripped by the upper and lower feed rollers. One of the guiding plates 79 or both plates are adjustably supported so that the space between the two can be varied. Such adjustment is secured by passing the bolts which connect the plate with the frame through slots in the plate. As the plate is being fed forwardly to the rollers, its front edge will strike a number of pins 80 carried by one of the feed rollers and adapted to engage openings in the other feed roller so that said pins act as stops for the plate. The eccentric is so arranged and constructed as to secure a forward movement of the top plate which is greater than the rotary movement of the feed rollers and the eccentric imparts the forward motion to the cup carrying means after the sheet previously fed to the rollers has passed clear of the sheets on the platform and nearly to the center line of the feed rollers. Inasmuch as the rollers have a circumference several inches in excess of the length of the sheet being machined, there is a time period elapsing during each revolution of the feed rollers as determined by the difference in the length of the sheet and the circumference of the rollers. By taking advantage of this interim of time, it is evident that the forward feed of a new sheet to the rollers can be accelerated and the new sheet can be moved faster than the periphery speed of the roller. This forward motion of the feed is so timed that the sheet is fed forward so that it comes in contact with stop pins 80 just before they are central with center line $a$—$b$. At this time, feed is advancing slightly faster than stop pins 80 and thus tend to hold the sheet against stop pins 80 until the pins have passed center line $a$—$b$, at which time return stroke of feed starts.

A vertically movable platform 81 is arranged in the table and carries the sheets, this platform being suitably guided for vertical movement and it has a depending stem 82 at its center, the lower end of which rests on a cam 84 carried by a shaft 85 journaled in the table, an arm 86 being connected with one end of the shaft and this arm is connected by a link 87 with the lower end of the bell crank so that the arm and the shaft 85 are given a rocking movement by the movement of the bell crank. This movement of the arm and shaft can be adjusted through means of the nuts 88 on the threaded lower end of the link and said arm carries a pair of dogs 89 for gripping a drum 90 on the shaft on the upward movement of the arm, the dogs simply riding over the drum on the downward movement. Thus the shaft 85 is given a step by step rotary movement, and this action causes the cam 84 to raise the platform step by step, so that the sheets thereon are successively brought into feeding position.

Each pair of rollers of the machine is connected together by the gears 91 so that the rollers will rotate in unison and these gears are used in the construction shown in the other figures, though they are not shown in said figures.

The feed rollers 9 carry the dies 92 for punching the sheets or for printing various data thereon.

It is thought from the foregoing description that the advantages and novel features of the invention will be readily apparent. It is to be understood that changes may be made in the construction and in the combination and arrangement of the several parts, provided that such changes fall within the scope of the appended claims.

What I claim is:—

1. An apparatus of the class described comprising a supporting frame, upper and lower feed rollers journaled therein, means for adjusting the upper roller toward and away from the lower roller, means for guiding a sheet between the rollers, upper and lower beading rollers receiving the sheet from the feeding rollers, means for adjusting the upper beading roller toward and away from the lower beading roller, upper and lower small rollers receiving the sheet from the beading rollers, means for adjusting the upper small roller toward and away from the lower small roller, a bending roller associated with the small rollers for bending the sheet as it leaves the small rollers, and means for adjusting the bending roller with respect to the small rollers.

2. An apparatus of the class described comprising a supporting frame, upper and lower feed rollers journaled therein, means for guiding a sheet between the rollers, upper and lower beading rollers receiving the sheet from the feeding rollers, upper and lower small rollers receiving the sheet from the beading rollers, as bending roller associated with the small rollers for bending the sheet as it leaves the small rollers, means for adjusting the bending roller with respect to the small rollers, a pair of links connecting each end of the upper small roller with each end of the bending roller, means for pivotally connecting together the links of each pair, a gear carried by one of the pivotal means, gears connected respectively with the upper small roller and the bending roller and meshing with the before mentioned gear, a gear on the lower small roller meshing with the gear on the upper small roller, intermeshing gears connecting the feeding rollers together, intermeshing gears connecting the beading rollers together and power-driven gears, one of which is connected with the lower gears of the feeding and beading rollers, an idle gear meshing with the other of said power-driven gears, and a gear on one of the small rollers meshing with the idle gear.

3. An apparatus of the class described comprising a supporting frame, upper and lower feed rollers journaled therein, means for guiding a sheet between the rollers, upper and lower beading rollers receiving the sheet from the feeding rollers, upper and lower small rollers receiving the sheet from the beading rollers, a bending roller associated with the small rollers for bending the sheet as it leaves the small rollers, means for adjusting the bending roller with respect to the small rollers, and a pair of adjustable steadying rollers engaging each of the beading rollers.

4. An apparatus of the class described comprising a supporting frame, upper and lower feed rollers journaled therein, means for guiding a sheet between the rollers, upper and lower beading rollers receiving the sheet from the feeding rollers, upper and lower small rollers receiving the sheet from the beading rollers, a bending rollers associated with the small rollers for bending the sheet as it leaves the small rollers, each beading roller comprising a plurality of sections, the sections on the upper roller forming annular grooves and the sections on the other roller forming annular beads, a mandrel carrying each set of sections, and means whereby the sections can be removed from each mandrel and other sections of different sizes substituted therefor.

5. An apparatus of the class described comprising a supporting frame, feed rollers journaled therein, upper and lower beading rollers receiving the sheet from the feeding rollers, upper and lower small rollers receiving the sheet from the beading rollers, a bending roller associated with the small rollers for bending the sheet as it leaves the small rollers, a feeding table at the front of the machine, a vertically movable platform associated with the table for supporting the sheets to be operated by the rollers, means actuated from one of the feed rollers for giving the platform a step-by-step upward movement, and means associated with the last-mentioned means for feeding the top sheet between the feed rollers.

6. An apparatus of the class described comprising a supporting frame, feed rollers journaled therein, upper and lower beading rollers receiving the sheet from the feeding rollers, upper and lower small rollers receiving the sheet from the beading rollers, a bending roller associated with the small rollers for bending the sheet as it leaves the small rollers, a feeding table at the front of the machine, a vertically movable platform associated with the table for supporting the sheets to be operated by the rollers, means actuated from one of the feed rollers for giving the platform a step-by-step upward movement, means associated with the last-mentioned means for feeding the top sheet between the feed rollers, the latter means comprising a rock shaft, horizontally movable blocks supported by the table and in which the shaft is journaled, arms on the shaft, vacuum cups on the arms, means for limiting the rocking movement of the shaft, and means for first rocking the shaft and then sliding the blocks by the means operated from the feed roller.

7. In combination with a rolling mill, a vertically movable platform for supporting the sheets to be rolled, a table in which the platform is arranged, horizontally arranged guide rods carried by the table, a pair of blocks slidably mounted on said rods, a shaft having its ends journaled in the blocks, arms on the shaft, vacuum cups on the arms for engaging the top sheet of the pile on the platform, a bell-crank pivoted to the table and having a slotted upper end, a crank on the shaft having a part passing through the slot, means for limiting rocking movement of the shaft, an eccentric on one of the feed rollers of the machine, means for connecting the eccentric with the bell-crank, adjustable guiding plates for guiding the sheet between the rollers, stop pins on the rollers for the sheets, and means connected with the bell-crank for moving the platform upwardly step-by-step.

In testimony whereof I affix my signature.

ROBERT J. BELL.